(12) United States Patent
Guerreiro et al.

(10) Patent No.: US 10,966,134 B2
(45) Date of Patent: *Mar. 30, 2021

(54) METHOD, BASE STATION AND A USER EQUIPMENT FOR SELECTING A SET OF BEAMS TO BE MONITORED BY SAID UE

(71) Applicant: Telefonaktiebolaget LM Ericsson (publ), Stockholm (SE)

(72) Inventors: Igor Moaco Guerreiro, Fortaleza (BR); Maria Fresia, Stockholm (SE); Victor Farias Monteiro, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

This patent is subject to a terminal disclaimer.

(21) Appl. No.: 16/434,690

(22) Filed: Jun. 7, 2019

(65) Prior Publication Data
US 2019/0289519 A1    Sep. 19, 2019

Related U.S. Application Data

(63) Continuation of application No. 15/555,280, filed as application No. PCT/EP2017/069410 on Aug. 1, 2017, now Pat. No. 10,349,330.

(51) Int. Cl.
*H04B 7/06* (2006.01)
*H04W 36/00* (2009.01)
(Continued)

(52) U.S. Cl.
CPC ........ *H04W 36/245* (2013.01); *H04B 7/0619* (2013.01); *H04B 7/0695* (2013.01);
(Continued)

(58) Field of Classification Search
CPC .. H04B 7/0061; H04B 7/0619; H04B 7/0695; H04W 36/0061; H04W 36/08; H04W 36/245; H04W 72/046
See application file for complete search history.

(56) References Cited

U.S. PATENT DOCUMENTS

2013/0059619 A1* 3/2013 Kim .................. H04B 7/063
455/509
2015/0230263 A1    8/2015 Roy et al.
(Continued)

FOREIGN PATENT DOCUMENTS

KR    20160143509 A    12/2016
WO    2016043502 A1     3/2016
WO    2016182072 A1    11/2016

OTHER PUBLICATIONS

3GPP, "3rd Generation Partnership Project; Technical Specification Group Radio Access Network; Study on New Radio Access Technology Physical Layer Aspects (Release 14)", 3GPP TR 38.802 V14.0.0, Mar. 2017, 1-143.

*Primary Examiner* — Gary Mui
(74) *Attorney, Agent, or Firm* — Murphy, Bilak & Homiller, PLLC

(57) ABSTRACT

A method of selecting a set of beams to be monitored by a User Equipment (UE) in a telecommunication network comprises the steps of receiving measurement data comprising measurements of qualities of beams observed by said UE, where said beams originate from at least one access node (AN) to the UE and from at least one other AN to the UE; retrieving at least one measurement data from a particular UE that matches the received measurement data, where the historical database comprises historical measurement data comprising measurements of qualities of beams observed by UE's in said telecommunication network over time; selecting a set of beams to be monitored by said UE based on the retrieved measurement data and based on subsequent measurement data of the particular UE over time in the historical database; and transmitting said selected set of beams to be monitored to said UE.

19 Claims, 8 Drawing Sheets

(51) Int. Cl.
*H04W 72/04* (2009.01)
*H04W 36/24* (2009.01)
*H04B 17/318* (2015.01)
*H04W 36/08* (2009.01)
*H04W 36/06* (2009.01)

(52) U.S. Cl.
CPC ...... *H04B 17/318* (2015.01); *H04W 36/0061* (2013.01); *H04W 36/08* (2013.01); *H04W 72/046* (2013.01); *H04W 36/0085* (2018.08); *H04W 36/00835* (2018.08); *H04W 36/06* (2013.01)

(56) References Cited

U.S. PATENT DOCUMENTS

| | | |
|---|---|---|
| 2016/0262077 A1 | 9/2016 | Zhang et al. |
| 2018/0084441 A1 | 3/2018 | Nagaraja et al. |
| 2018/0097556 A1 | 4/2018 | Nagaraja et al. |
| 2018/0146389 A1* | 5/2018 | Nagata ................ H04W 24/08 |
| 2018/0220398 A1 | 8/2018 | John Wilson et al. |
| 2019/0007122 A1* | 1/2019 | Furuskog ............ H04W 36/305 |
| 2019/0238210 A1* | 8/2019 | Tang .................... H04B 17/318 |

* cited by examiner

METHOD, BASE STATION AND A USER EQUIPMENT FOR SELECTING A SET OF BEAMS TO BE MONITORED BY SAID UE

TECHNICAL FIELD

The present invention generally relates to selecting a set of beams to be monitored and, more specifically, to selecting the beams based on historical measurement data of qualities of beams previously observed by User Equipment.

BACKGROUND

Extremely high frequency, EHF, is the International Telecommunications Union, ITU, designation for the band of radio frequencies in the electromagnetic spectrum from 30 to 300 gigahertz, GHz. Radio waves in this band have wavelengths from ten to one millimetre, giving it the name millimetre band or millimetre wave, sometimes abbreviated MMW or mmW.

These frequency bands are envisioned to be used as the corresponding spectrum is not as occupied as compared to frequently used frequency bands, for example frequency bands below 6 GHz, thereby improving system capacity. Propagation effects are, however, severe in these frequency bands. For example, signal quality decays quickly with distance and, for example, diffraction, penetration and/or reflection losses are considered to be high.

One of the proposed advancements in this area is to use beamforming with narrow beams and high directivity using very-large antenna arrays, namely massive Multiple-Input-Multiple-Output, MIMO, antennas.

Beamforming or spatial filtering is a signal processing technique used in arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array.

Following the above, it may be advantageous if measurement and reporting of multiple narrow beams, or simply put beam management, is efficiently addresses so that access nodes, AN's, are able to, for example, keep the signal quality experienced on the user side, i.e. at the User Equipment, UE, above a predetermined threshold.

It is noted that for the next generation of radio technology, namely 5G new radio, NR, 3GPP briefly describes a set of procedures to beam management indicating that the procedure to intra/inter AN's beam switch can use a smaller set of beams compared to the joint beam space.

In Long Term Evolution, LTE, neither massive MIMO antennas nor mm-Wave bands are supported. Thus, the LTE solution only supports the management of the entire beam space. The use of such a solution to manage several narrow beams would prohibitively increase the signalling burden.

Currently deployed solutions are based on beam training. That is, the beams, or the set of beams, to be used for transmission is determined based on UE measurements on previously selected beams. These measurements may, for example, be out-of-date and this can cause a spatial misalignment that may lead to beam failure.

SUMMARY

It is an object to provide for methods of selecting beams to be monitored by a User Equipment, UE, thereby, amongst other, reducing overhead signalling in a telecommunication network.

It is another object to provide for a base station function, a User Equipment, UE, as well as a non-transitory computer-readable storage medium involved within the methods as presented.

In a first aspect, there is provided a method of selecting a set of beams to be monitored by a User Equipment, UE, in a telecommunication network, said telecommunication network comprising a Base Station, BS, function coupled to at least one Access Node, AN, serving said UE The method comprising the steps of receiving, by said BS function, from said UE, measurement data comprising measurements of qualities of beams observed by said UE, wherein said beams originate from at least said at least one AN to said UE, retrieving, by said BS function, in a historical database, at least one measurement data from a particular UE that is most similar to the received measurement data, wherein the historical database comprises historical measurement data comprising measurements of qualities of beams observed by UE's in said telecommunication network over time, selecting, by said BS function, a set of beams to be monitored by said UE based on said retrieved at least one measurement data from said particular UE and based on subsequent measurement data of said particular UE over time in said historical database, and transmitting, by said BS function, said selected set of beams to be monitored to said UE.

The method is at least based on the insight that historical measurements may be taken into account in determining which beams the UE should monitor. The historical database may be empty at first, and may be filled during runtime. As such, measurements related to qualities of beams observed by UE's may be stored in the historical database, and a relationship in time between those measurements may be stored as well. The above entails that the database comprises measurements of qualities of beams observed by UE's over time.

One of the advantageous of the above described method is that it is more likely that good quality beams are selected for the UE, as the selecting process is based on previous measurements. The previous measurements may even be related to the same UE. This enables the selecting process to take into account movement habits of the particular UE.

For example, it can be detected that a particular UE often travels between two geographical locations, i.e. once a day, once a week or anything alike. Such a habit can be detected in the historical database. Patterns in previous measurements of that particular UE may reflect such a habit, and these patterns may be detected, and used, for selecting the beams to be monitored. As such, the BS function is able to properly estimate the beams that are to be used to that particular UE.

It is noted that, in accordance with the present disclosure, the beams may originate from a massive Multiple-Input-Multiple-Output, MIMO, transmission technique. Each of the Access Nodes, AN's, may comprise a plurality of array antenna's and/or multiple antenna's for directivity purposes.

Massive MIMO may entail systems that use antenna arrays with, for example, a few hundred of antennas, simultaneously serving many tens of UE's in the same time-frequency resource. The basic aspect of massive MIMO is to reap all the benefits of conventional MIMO, but on a greater scale.

Each antenna may be small, preferably fed via an optical or electric digital bus. Massive MIMO relies on spatial multiplexing that in turn relies on the base station, i.e. the base station function, having channel knowledge, both on the uplink and the downlink. On the uplink, this may be accomplished by having the terminals send pilots, based on which the base station estimates the channel responses to each of the terminals.

In accordance with the present disclosure, the BS function receives measurement data comprising measurements of qualities of beams observed by the UE. These beams originate from at least one Access Node. The UE may observe beams from a plurality of Access Nodes, AN's, simultaneously. These measurements relate to the qualities of the beams, for example the signal-to-noise ratios, or anything alike.

The BS function will then retrieve, in a historical database, at least one measurement data from a particular UE that matches the received measurement data. This means that the function searches the database for any historical measurement data that best resembles the received measurement data. For example, the received measurement data may indicate a particular order of the beams, wherein the beams are ordered by their measured quality. The beam having the highest quality is put first, the beam having the second highest quality is put second, etc. The BS function will then search the historical database for measurement data comprising a same, or similar, order of beams.

The retrieved measurement data is associated, in the historical database, with subsequent measurement data. The historical measurement data is related to a measurement made by a particular UE at a certain point in time T1. That same particular UE has made another measurement at a subsequent point in time T2. The corresponding measurement data of this subsequent measurement is associated with the retrieved measurement data in the historical database. The corresponding measurement data is then used for the selection purpose. That is, the BS function selects a set of beams, from the corresponding measurement data, to be monitored by the UE.

In a final step, the selected set of beams to be monitored is transmitted to the UE.

In accordance with the present disclosure, the BS function may be implemented in a base station, in a network node, in the cloud or anything alike.

In accordance with the present disclosure, the measurements may be performed on longer time scales such as averaged over a radio frame or a plurality of radio frames, e.g. 50-100 milliseconds. However, the examples described herein are also applicable for traffic measurements performed on shorter time scale such as on symbol, time slot or sub frame basis or even on a shorter time scale.

The selected set of beams may also be used, by the BS function, for a particular radio operation task. A radio operation task is, for example, any of a cell change between two cells, scheduling or resource assigning, load balancing, network planning or tuning of network parameters, controlling uplink and/or downlink power, avoiding and/or mitigating interference, etc.

The BS function may receive the measurement data from the UE in any one or more of the following manners: periodically, on event triggered basis, e.g. when a certain measurement exceeds a threshold or falls below a threshold, and in response to a request sent by the BS function to the UE.

One of the advantages of the presented method is that the control channel between the UEs and the access nodes is relieved. That is, compared to the prior art, the UE is presented with a set of beams to be monitored, wherein the set of beams is a subset of all the beams that are available for the UE to be monitored. As such, the control channel only needs to be used for exchanging information with respect to that particular subset of beams.

Another advantage is that the UE does not need to monitor all the beams that are available for the UE to be monitored. The UE is presented with a subset of beams. This received unnecessary processing power by the UE.

In an example, the received measurement data comprising measurements of qualities of beams observed by said UE comprises:
  a signal-to-noise ratio for each of said beams;
  a Received Signal Strength Indicator, RSSI, for each of said beams;
  a Reference Signal Received Power, RSRP for each of said beams;
  a Reference Signal Received Quality, RSRQ, for each of said beams.

In another example, the method further comprises the step of:
  storing, by said BS function, said received measurement data in said historical database.

The advantage of this example is that the historical database is filled adequately. As mentioned before, the historical database may be empty initially. The historical database may then be filled with all kinds of measurement data generated by UEs present in the telecommunication network. An increasing amount of measurement data present in the historical database increases the likelihood that a received measurement data matches any of the historical measurement data present in the database.

In a further example, the method further comprises the steps of:
  determining, by said BS function, based on said retrieved at least one measurement data from said particular UE and based on subsequent measurement data of said particular UE over time in said historical database, that said UE is to be handed over to a different AN in said telecommunication network;
  performing, by said BS function, a handover of said UE to said determined different AN in said telecommunication network.

In a further example, said step of transmitting, by said BS function, said selected set of beams to be monitored to said UE further comprises:
  transmitting, by said BS function, a frequency parameter indicating to said UE how many measurements for said selected set of beams are to be performed by said UE.

Here, the BS function determined how often the measurements are to be performed by the UE.

In a second aspect of the present disclosure, there is provided a method of monitoring a set of beams, by a User Equipment, UE, in a telecommunication network served by an Access Node, AN, said method comprising the steps of:
  receiving, by said UE, a set of beams to be monitored;
  measuring, by said UE, qualities of said received set of beams to be monitored;
  selecting, by said UE, a subset of said set of beams based on said measured qualities of said received set of beams, and
  transmitting, by said UE, measurement data comprising measurements of qualities of said subset of beams to said AN.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the base station as well as the User Equipment.

In a third aspect, there is provided a network node, for example a Base Station, BS, arranged for selecting a set of beams to be monitored by a User Equipment, UE, in a telecommunication network, said BS being coupled to at least one Access Node, AN, serving said UE, said BS comprising:

receive equipment arranged for receiving, from said UE, measurement data comprising measurements of qualities of beams observed by said UE, wherein said beams originate from said at least one AN to said UE, and originate from at least another AN in said telecommunication network to said UE;

retrieve equipment arranged for retrieving in a historical database, at least one measurement data from a particular UE that matches the received measurement data, wherein the historical database comprises historical measurement data comprising measurements of qualities of beams observed by UE's in said telecommunication network over time, select equipment arranged for selecting a set of beams to be monitored by said UE based on said retrieved at least one measurement data from said particular UE and based on subsequent measurement data of said particular UE over time in said historical database;

transmit equipment arranged for transmitting said selected set of beams to be monitored to said UE.

In an example, said received measurement data comprising measurements of qualities of beams observed by said UE comprises:

a signal-to-noise ratio for each of said beams;
a Received Signal Strength Indicator, RSSI, for each of said beams;
a Reference Signal Received Power, RSRP for each of said beams;
a Reference Signal Received Quality, RSRQ, for each of said beams.

In a further example, the BS further comprises:
store equipment arranged for storing said received measurement data in said historical database.

In yet another example, the BS further comprises:
process equipment arranged for determining, based on said retrieved at least one measurement data from said particular UE and based on subsequent measurement data of said particular UE over time in said historical database, that said UE is to be handed over to a different AN in said telecommunication network, and for performing a handover of said UE to said determined different AN in said telecommunication network.

In an example, the transmit equipment is further arranged for:

transmitting a frequency parameter indicating to said UE how many measurements for said selected set of beams are to be performed by said UE.

In a fourth aspect, there is provided a User Equipment, UE, arranged for monitoring a set of beams in a telecommunication network, said UE being arranged to be served by an Access Node in said telecommunication network, said UE comprising:

receive equipment arranged for receiving a set of beams to be monitored;

measure equipment arranged for measuring qualities of said received set of beams to be monitored;

select equipment arranged for selecting a subset of said set of beams based on said measured qualities of said received set of beams, and transmit equipment arranged for transmitting measurement data comprising measurements of qualities of said subset of beams to said AN.

In a fifth aspect, there is provided a Base Station, BS, for selecting a set of beams to be monitored by a User Equipment, UE, in a telecommunication network, said BS being coupled to at least one Access Node, AN, serving said UE, said BS comprising:

receive module for receiving, from said UE, measurement data comprising measurements of qualities of beams observed by said UE, wherein said beams originate from said at least one AN to said UE, and originate from at least another AN in said telecommunication network to said UE;

retrieve module for retrieving in a historical database, at least one measurement data from a particular UE that matches the received measurement data, wherein the historical database comprises historical measurement data comprising measurements of qualities of beams observed by UE's in said telecommunication network over time, select module for selecting a set of beams to be monitored by said UE based on said retrieved at least one measurement data from said particular UE and based on subsequent measurement data of said particular UE over time in said historical database;

transmit module for transmitting said selected set of beams to be monitored to said UE.

In a sixth aspect, there is provided a User Equipment, UE, for monitoring a set of beams in a telecommunication network, said UE being arranged to be served by an Access Node in said telecommunication network, said UE comprising:

receive module for receiving a set of beams to be monitored;

measure module for measuring qualities of said received set of beams to be monitored;

select module for selecting a subset of said set of beams based on said measured qualities of said received set of beams, and transmit module for transmitting measurement data comprising measurements of qualities of said subset of beams to said AN.

In a seventh aspect, there is provided a computer program product, comprising a readable storage medium, comprising instructions which, when executed on at least one processor, cause the at least one processor to carry out the method according to any of the examples as provided above.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
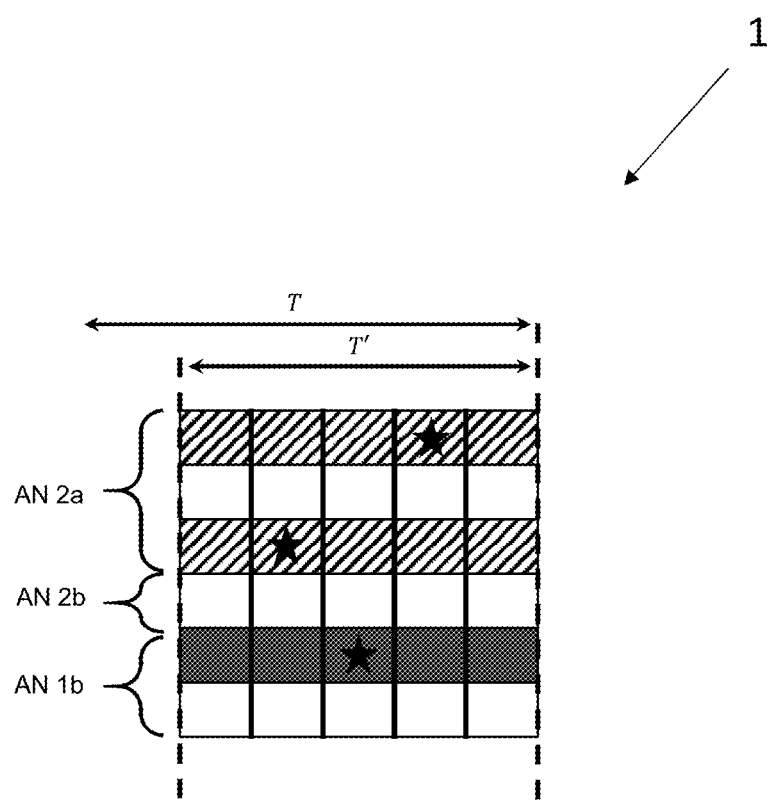
FIG. 1 shows an example of how measurement data can be obtained by a User Equipment, UE.

FIG. 1 shows an example 1 of how measurement data can be obtained by a User Equipment, UE. The present example is 1 is explained with respect to a selection of a set of beams to be monitored for a particular UE.

The beam selection procedure for beam tracking may be described as follows. A Base Station, BS, function serving the particular UE determines a set of beams from at least one directly connected Access Node, AN, and another set of beams from at least one AN belonging to one neighbor BS. The serving BS relies on available historical statistics of UEs and on measurement data from its served UE to determine these set of beams that keep an adequate spatial alignment of these beams with its served UE.

In this example, the served UE measures the quality of the received signal for every determined beam during a determined period T', say a number of time instants when measurement is considered, within a determined beam reporting period T≥T', when the served UE reports the measurement data to its serving BS with respect to a portion, say M, of the beams received above a certain predefined threshold.

The number of beams that can be monitored by the UE may be greater than the amount of feedback that the UE is able to report to the BS function, i.e. M. During the measuring period T', the UE may store all kinds of quality values of detected and decoded beams for all the beams in the determined set. At the end of T', the UE may select the M beams to be reported, which are the ones with highest signal quality during the T' measured time instants. In the current scenario, M is fixed and depends on the capability of the UE.

FIG. 1 shows the monitored beams, which are the six beams as indicated with AN2a, AN 2b and AN1b. Further, M=3, and T' comprises 5 time slots. The UE may store all the values, and after T', the UE may select the highest three values it can find in the table, for example the ones as indicated with the stars in the grid. The UE then reports to the BS the corresponding measurement data, i.e. the qualities of the beams, for the whole time T'. Other means of selecting the M highest values are also possible. For instance, the UE can select the M highest values after a pre-processing, e.g. time averaging, of all the stored values.

The serving BS function receives measurement data from its served UE. The BS function then searches in the historical database for a number of most likely, or most similar, samples, i.e. measurement data, to the received measured measurement data. An estimate of metric values, related to the measurement data, in a few time instants ahead and for all relevant beams can then be obtained based on the most similar samples. By using the estimated metric values, the serving BS function can determine a set of beams from its ANs that provide an improved spatial alignment to the UE for some time instants ahead.

This may result in, for example, an intra BS beam handover. Furthermore, also based on the estimated metric values, the serving BS may determine another set of beams from ANs of at least a neighbor BS that can potentially provide the best spatial alignment to its served UE. This may further yield an inter-BS beam handover. Furthermore, the serving BS may determine the values of T', T and may select M. At last, the serving BS informs its served UE the set of selected beams to be monitored and the determined parameter values.

Figure 2:
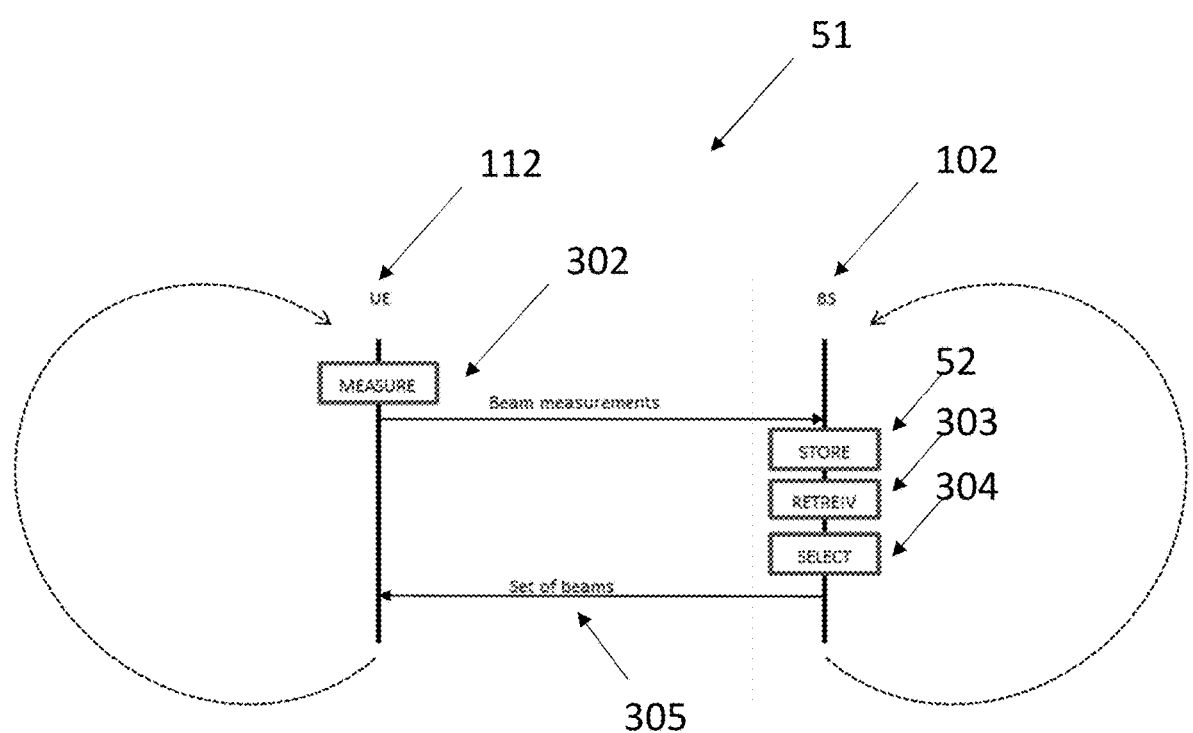
FIG. 2 shows an example of an illustration displaying a basic aspect of the present disclosure.

FIG. 2 shows an example of an illustration 51 displaying a basic aspect of the present disclosure.

The illustration 52 provides for a basic overview of the steps that are taken in accordance with the present disclosure. Beam measurements are performed by the UE 112, and those beam measurements are provided 302 to the Base station function 102.

The base station function 102 may store 52 these measurement, i.e. the measurement data in a historical database for further use. Further, the base station function 102 retrieves at least one measurement data from the same historical database, wherein the at least one measurement data best matches the measurement data received from the UE 112. Based on the retrieved measurement data, the base station function 112 selects 304 particular beams for which the UE 112 should perform measurement in subsequent time periods. The selected beams are provided 305 to the UE 112.

The communication between the UE 112 and the base station function 102 is provided over an air interface, i.e. wirelessly. Typically, a control channel message over a control channel is utilized. Reducing the amount of beams for which the UE 112 is to perform quality measurements also reduces the amount of signalling between the UE 112 and the base station function 102. This, thus, improves the efficiency of the telecommunication network.

It is further noted that the selected set of beams are provided to the UE 112. In practice, it may be identifiers of the selected beams that are provided to the UE 112, not the beams themselves. As such, transmitting a set of beams may be interpreted as transmitting identifications of the selected beams to the UE 112.

Figure 3:
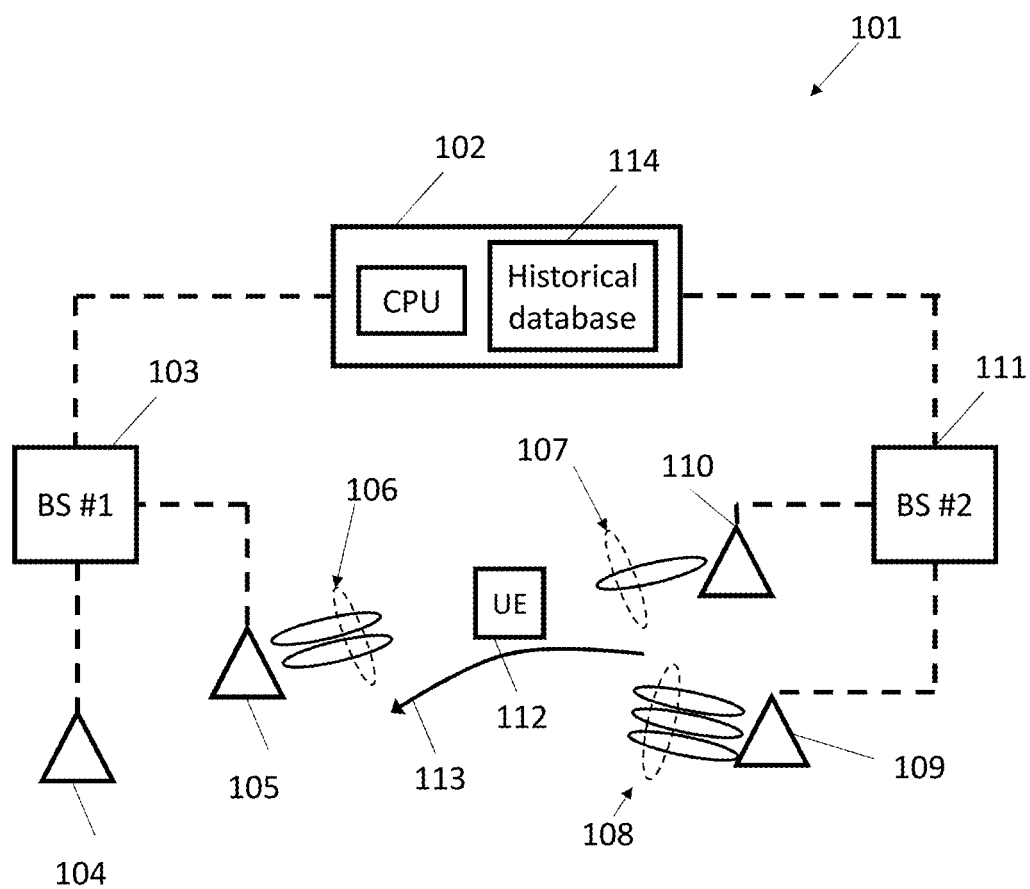
FIG. 3 shows a part of a telecommunication network in accordance with the present disclosure.

FIG. 3 shows a part of a telecommunication network 101 in accordance with the present disclosure.

The telecommunication network 101 comprises two base stations 103, 111, wherein the first base station 103 has two access nodes, AN's, 104, 105, and wherein the second base station 111 has another two AN's 109, 110.

A Base Station, BS, function 102 is provided, which BS function 102 is arranged to perform beam management for UE tracking. It is noted that the BS function 102 may be implemented in a Base station 103, 111 or any other node in the telecommunication network. The BS function 102 may be provided as a cloud service, wherein the processing is performed in the cloud.

Here, a User Equipment, UE, 112 is shown which is arranged to travel a particular trajectory 113. One of the aspects of the present disclosure is that the trajectory may be estimated based on previous measurements performed by that same, or any other, UE. In this particular scenario, the UE 112 is arranged to monitor six beams 106, 107, 108. The beams as referenced to with reference numeral 106 originate from the AN with reference numeral 105. The beam as referenced to with reference numeral 107 originates from the AN with reference numeral 110. The beams as referenced to with reference numeral 108 originate from the AN as referenced to with reference numeral 109.

The UE 112 will monitor each of these beams 106, 107, 108 during a predefined time period, for example a plurality of time slots or a plurality of symbols. This means that the UE 112 may performed quality measurements with respect to those beams 106, 107, 108. The UE 112 will thus generate measurement data, wherein the measurement data is related to the quality of the beams 106, 107, 108 that have been monitored/measured.

In accordance with the present disclosure, the quality of the beams may be measured in terms of signal to noise ratio or any other type of measurement. Further, the measurement for the qualities of the beams 106, 107, 108 may be performed in parallel, substantially in parallel, or subsequently to each other.

The UE 112 may, subsequently, select a subset of the beams 106, 107, 108 that have been monitored. In this particular example, the UE may select the beams as referenced to with reference numeral 106. Alternatively, the UE 112 may provide all measurement data, i.e. from all the six beams 106, 107, 108, to the AN 105 via which it is connected to the base station as indicated with reference numeral 103.

The BS function 102 will then retrieve, in a historical database 114, at least one measurement data from a particular UE that matches the measurement data from the UE 112. The historical database 114 comprises historical measurement data comprising measurements of qualities of beams observed by UE's in the telecommunication network over time.

As such the measurement data provided by the UEs in the telecommunication network may be stored in the historical database 114. The measurement data may be provided with a time stamp, or any other meta data that indicated the moment when the corresponding measurement was made. This allows for patterns to be detected in the historical database. Measurement data can be associated with each other based on the time stamps that are provided and based on, for example, identifications of the UEs that made those particular corresponding measurements.

The BS function 102 then selects a set of beams to be monitored by the UE 112 based on the retrieved at least one measurement data from the particular UE, and based on subsequent measurement data of the particular UE over time in the historical database.

In this particular scenario, the trajectory 113 may be estimated based on previous measurements of that particular UE that are stored in the historical database 114. That particular information may be used, in the telecommunication network, to initiate a handover of the UE 112, for example a intra BS handover or an inter BS handover.

Figure 4:
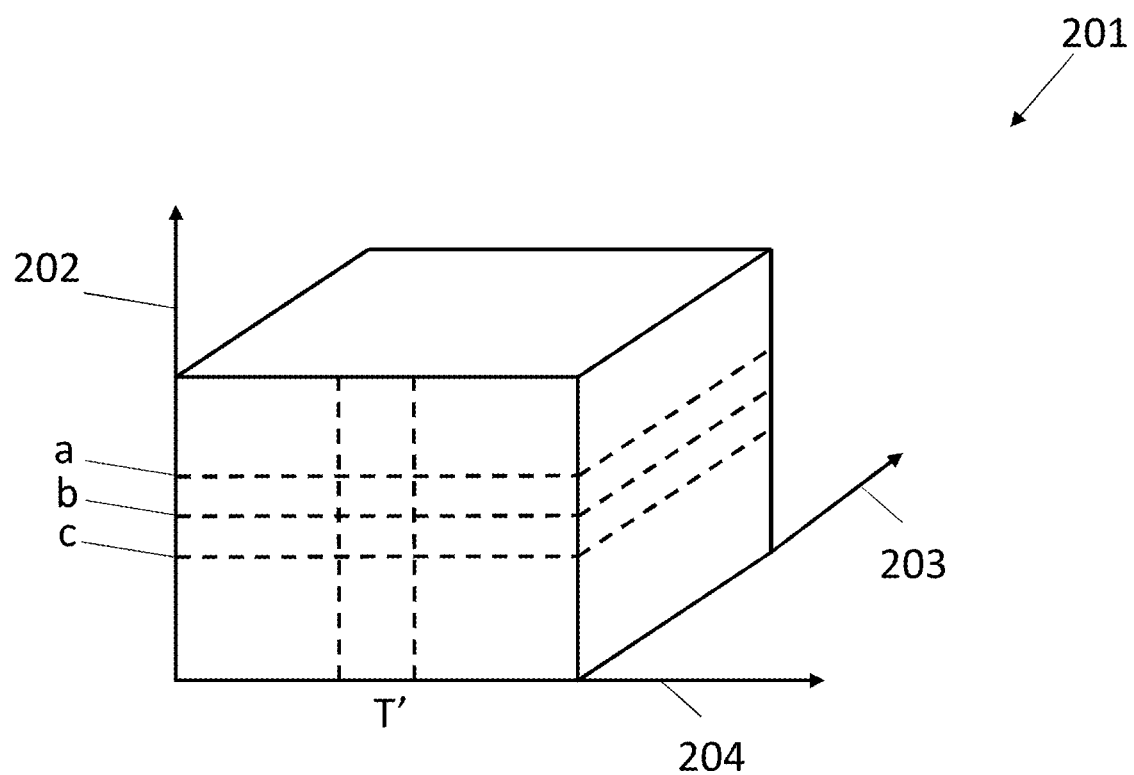
FIG. 4 shows a structure in which the measurement data is stored in the historical database.

FIG. 4 shows a structure in which the measurement data is stored in the historical database.

The measurement data that is stored may be conceptually visualized as data that is stored using three dimensions 202, 203, 204. The first dimension, i.e. as indicated with reference numeral 202, is related to the identification of the beams. The second dimension, i.e. as indicated with reference numeral 203, is related to the identification of the samples. The third dimension, i.e. as indicated with reference numeral 204, is related to the time instants.

In accordance with the present disclosure, the BS function retrieves at least one measurement data from a particular UE that matches the received measurement data. This may be accomplished as follows.

The BS function may select one or more slices of the historical database, wherein the slice is made in the data structure 201 in a plane defined by the dimensions as indicated with reference numerals 202 and 204. As such, a particular slice is directed to a single sample, i.e. to a measurement made by a particular UE.

Each of the slices comprises measurement data, i.e. measurements of qualities of respective beams and a time indication when those measurements were performed. The BS function may thus select one, or more, of those slices that best resemble(s) the received measurement data, i.e. the actual measurement performed by the UE.

Based on the selected slice, the BS function may select the beams that have the highest Signal-to-Noise ratio in the time instants ahead, i.e. in the subsequent time frames in that same slice.

Figure 5:
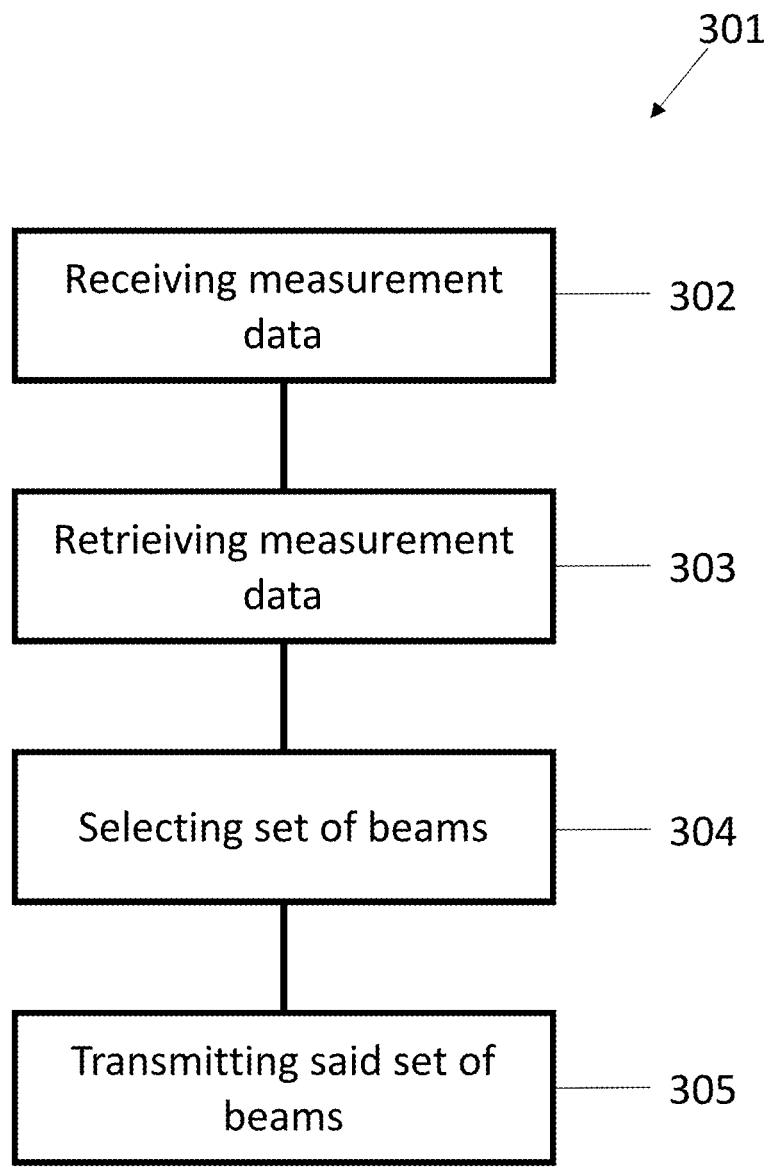
FIG. 5 shows an example of a method in accordance with the present disclosure.

FIG. 5 shows an example of a method 301 in accordance with the present disclosure.

The method 301 is directed to the selection of a set of beams to be monitored by a User Equipment, UE, in a telecommunication network, said telecommunication network comprising a Base Station, BS, function coupled to at least one Access Node, AN, serving said UE.

The method comprises the step of receiving 302, by said BS function, from said UE, measurement data comprising measurements of qualities of beams observed by said UE, wherein said beams originate from said at least one AN to said UE, and originate from at least another AN in said telecommunication network to said UE.

The above entails that the UE has performed quality measurements with respect to beams that it was requested to monitor. These measurements, or a subset thereof, are provided to the BS function using measurement data.

In a next step, the BS function retrieves 303, in a historical database, at least one measurement data from a particular UE that matches the received measurement data, wherein the historical database comprises historical measurement data comprising measurements of qualities of beams observed by UE's in said telecommunication network over time.

In accordance with the present disclosure, matching means that the BS function finds historical measurement data in the historical database that best matches the received measurement data. The historical measurement data subsequent to the matched historical measurement data may then be used, by the BS function to select a set of beams to be monitored by the UE which is explained here below.

Thus, in a next step, the BS function selects 304 a set of beams to be monitored by said UE based on said retrieved at least one measurement data from said particular UE and based on subsequent measurement data of said particular UE over time in said historical database. As such, the BS function may be able to perform an educated guess about the beams that could be of interest for the UE, i.e. the beams that could have the highest quality for the UE.

In a final step, the BS function transmits said selected set of beams to be monitored to said UE.

Figure 6:
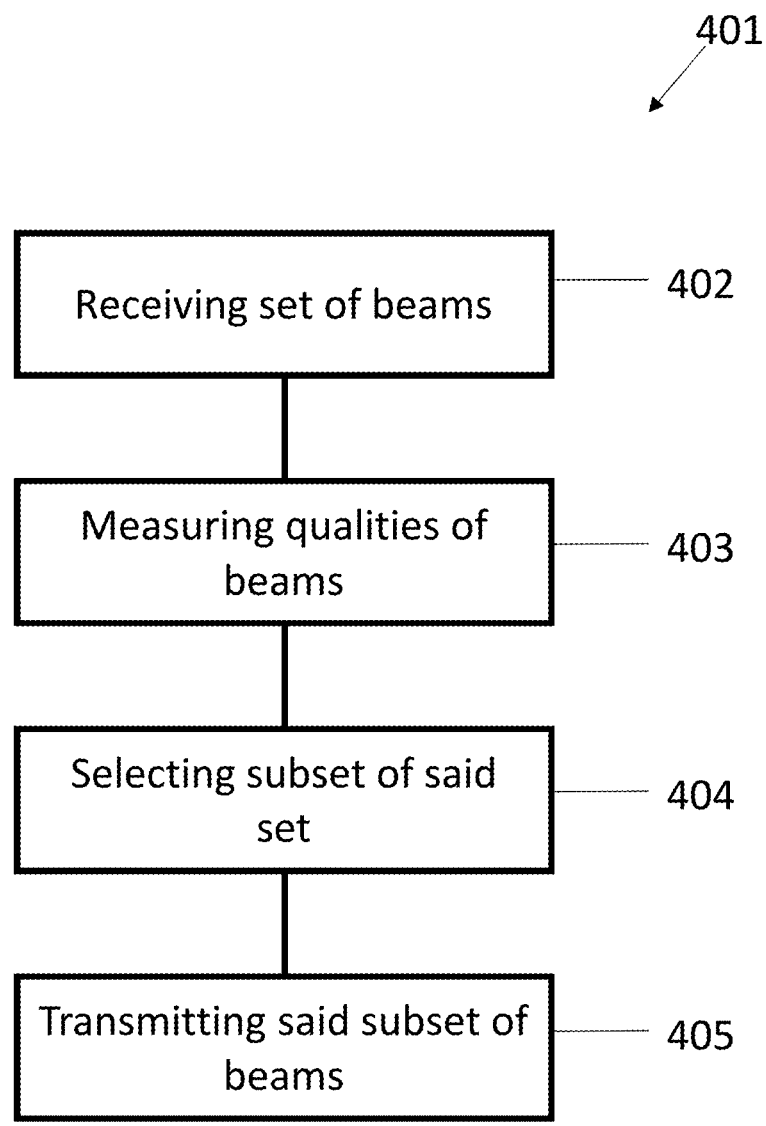
FIG. 6 shows another example of a method in accordance with the present disclosure.

FIG. 6 shows another example of a method 401 in accordance with the present disclosure.

The method 401 is directed to the monitoring of a set of beams, by a User Equipment, UE, in a telecommunication network served by an Access Node, AN.

The method comprises the steps of:

Receiving 402, by said UE, a set of beams to be monitored;

Measuring 403, by said UE, qualities of said received set of beams to be monitored;

Selecting 404, by said UE, a subset of said set of beams based on said measured qualities of said received set of beams, and Transmitting 405, by said UE, measurement data comprising measurements of qualities of said subset of beams to said AN.

Figure 7:
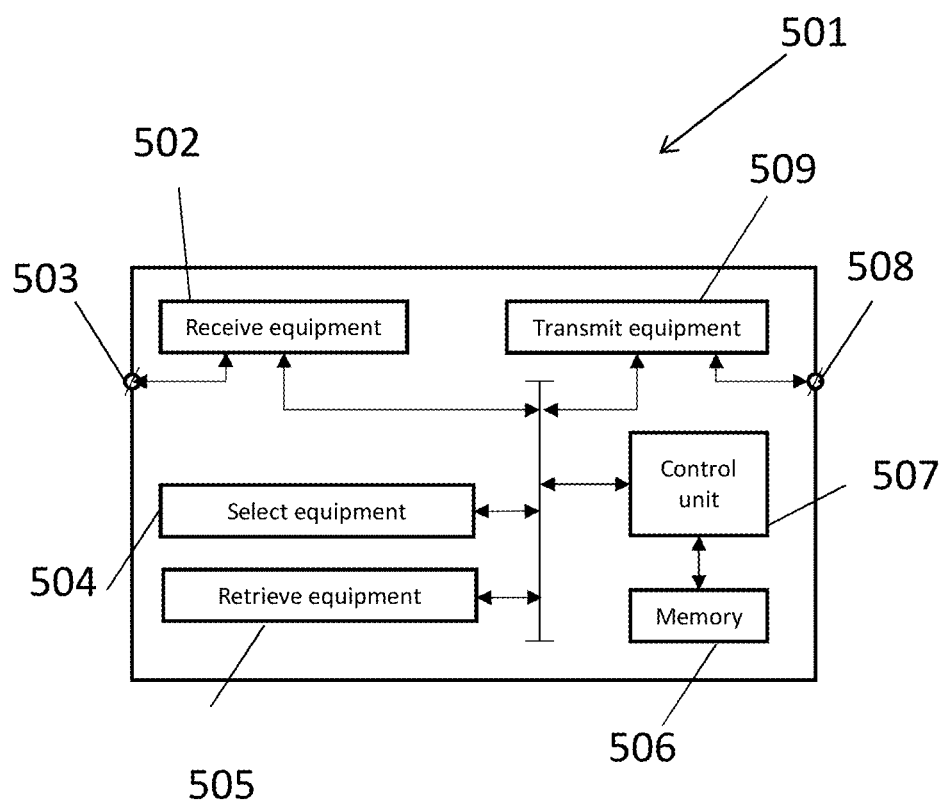
FIG. 7 shows an example of a Base Station function in accordance with the present disclosure.

FIG. 7 shows an example of a Base Station function 501 in accordance with the present disclosure.

Here, the Base Station function 501 is explained with respect to a particular base station. It is however noted that the Base Station function 501 may also be provided as a service running in the cloud, in any network node, distributed among network nodes, or anything alike.

The Base Station function 501 is arranged for selecting a set of beams to be monitored by a User Equipment, UE, in a telecommunication network, said BS being arranged to be coupled to at least one Access Node, AN, serving said UE.

The BS function 501 comprises receive equipment 502 arranged for receiving, from said UE, measurement data comprising measurements of qualities of beams observed by said UE, wherein said beams originate from said at least one AN to said UE.

The BS function 501 further comprises retrieve equipment 505 arranged for retrieving in a historical database, at least one measurement data from a particular UE that matches the received measurement data, wherein the historical database comprises historical measurement data comprising measurements of qualities of beams observed by UE's in said telecommunication network over time.

The BS function 501 further comprises select equipment 504 arranged for selecting a set of beams to be monitored by said UE based on said retrieved at least one measurement data from said particular UE and based on subsequent measurement data of said particular UE over time in said historical database.

The BS function 501 further comprises transmit equipment 509 arranged for transmitting said selected set of beams to be monitored to said UE.

The BS function 501 comprises a control unit 507 and a memory 506, which control unit 507 is connected to the retrieve equipment 505, the select equipment 504, the receive equipment 502 and the transmit equipment 509.

Incoming data packets or messages pass through the input terminal 503 before they reach the receive equipment 502, or receive module. Outgoing data packets or messages pass, or are sent, by the transmit equipment 509, or a transmit module, via the output terminal 508.

Figure 8:
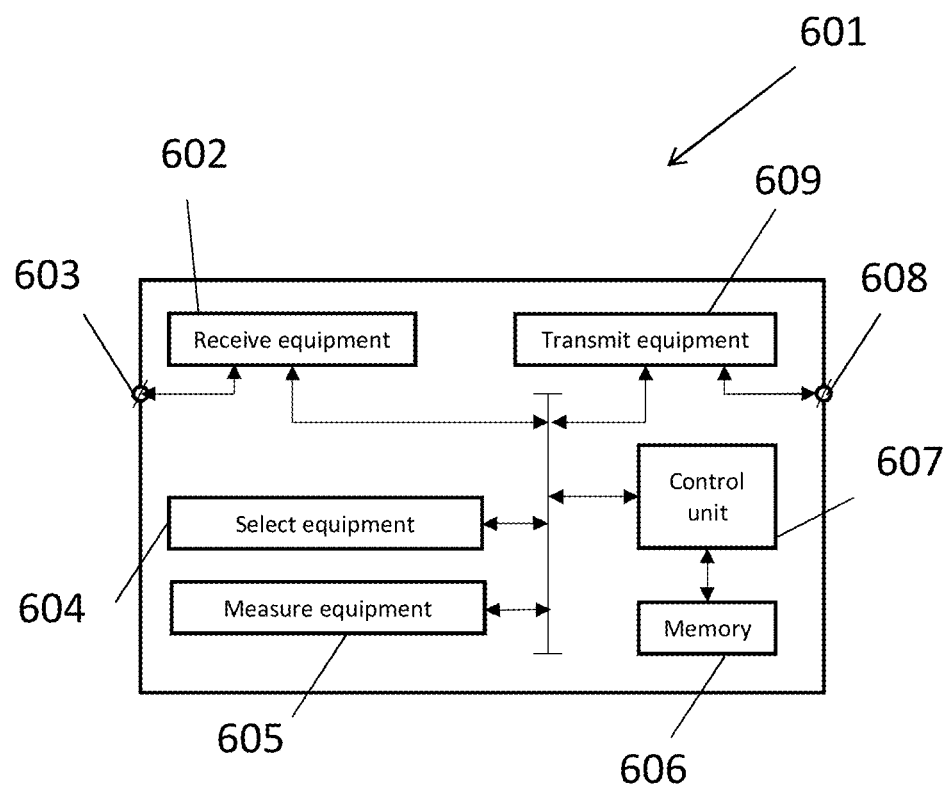
FIG. 8 shows an example of a User Equipment in accordance with the present disclosure.

FIG. 8 shows an example of a User Equipment 601 in accordance with the present disclosure.

The User Equipment, UE, 601 is arranged for monitoring a set of beams in a telecommunication network, said UE being arranged to be served by an Access Node in said telecommunication network. The UE comprising:
  receive equipment 602 arranged for receiving a set of beams to be monitored;
  measure equipment 605 arranged for measuring qualities of said received set of beams to be monitored;
  select equipment 604 arranged for selecting a subset of said set of beams based on said measured qualities of said received set of beams, and
  transmit equipment 609 arranged for transmitting measurement data comprising measurements of qualities of said subset of beams to said AN.

The UE 601 comprises a control unit 607 and a memory 606, which control unit 607 is connected to the receive equipment 602, the select equipment 604, the measure equipment 605 and the transmit equipment 609.

Incoming data packets or messages pass through the input terminal 603 before they reach the receive equipment 602, or receive module. Outgoing data packets or messages pass, or are sent, by the transmit equipment 609, or a transmit module, via the output terminal 608.

The present invention is not limited to the embodiments as disclosed above, and van be modified and enhanced by those skilled in the art beyond the scope of the present invention as disclosed in the appended claims without having to apply inventive skills.

What is claimed is:

1. A method of selecting a set of beams to be monitored by a wireless device in a wireless network, said method comprising:
  receiving from the wireless device, by a network node in the wireless network, measurement data comprising measurements of qualities of beams observed by the wireless device, wherein said beams include at least one beam that originates from a first access node in the wireless network and at least one beam that originates from a second access node in the wireless network, the second access node differing from the first access node;
  retrieving, by the network node, from a historical database, at least one measurement data from a particular wireless device similar to the received measurement data, wherein the historical database comprises historical measurement data comprising measurements of qualities of beams observed by wireless devices in said wireless network over time,
  selecting, by the network node, a set of beams to be monitored by the wireless device based on said retrieved at least one measurement data and based on subsequent measurement data of the particular wireless device over time in said historical database;
  sending to the wireless device, by the network node, an indication of said selected set of beams to be monitored by the wireless device.

2. The method of claim 1, wherein said received measurement data comprising measurements of qualities of beams observed by said UE comprises at least one of any of:
  a signal-to-noise ratio for each of said beams;
  a Received Signal Strength Indicator (RSSI) for each of said beams;
  a Reference Signal Received Power (RSRP) for each of said beams; and
  a Reference Signal Received Quality (RSRQ) for each of said beams.

3. The method of claim 1, wherein said method further comprises the step of:
  storing, by the network node, said received measurement data in said historical database.

4. The method of claim 1, wherein said method further comprises the steps of:
  determining, by the network node, based on said retrieved at least one measurement data from said particular wireless device and based on subsequent measurement data of said particular wireless device over time in said historical database, that said wireless device is to be handed over to a different access node in said wireless network; and
  performing, by the network node, a handover of said wireless device to said determined different access node in said wireless network.

5. The method of claim 1, wherein said step of sending further comprises:

sending a frequency parameter indicating to said wireless device how many measurements for said selected set of beams are to be performed by said wireless device.

6. A method of monitoring a set of beams, by a wireless device in a wireless network served by an Access Node (AN), said method comprising the steps of:
   receiving, by said wireless device, an indication of a set of beams to be monitored;
   measuring, by said wireless device, qualities of the set of beams;
   selecting, by said wireless device, a subset of said set of beams, based on said measured qualities; and
   transmitting, by said wireless device, measurement data comprising measurements of qualities of only said subset of beams to said AN.

7. The method of claim 6, wherein said measurements of qualities comprise at least one of any of:
   a signal-to-noise ratio for each of said beams;
   a Received Signal Strength Indicator (RSSI) for each of said beams;
   a Reference Signal Received Power (RSRP) for each of said beams; and
   a Reference Signal Received Quality (RSRQ) for each of said beams.

8. The method of claim 6, wherein said subset of said beams consists of a fixed quantity of beams.

9. The method of claim 6, wherein said receiving step comprises receiving said set of beams from a plurality of Access Nodes.

10. The method of claim 6, further comprising receiving, in response to transmitting said measurement data to said AN, an indication of another set of beams to be monitored.

11. A network node configured to select a set of beams to be monitored by a wireless device in a wireless network, the network node comprising:
   a receiver configured to receive, from said wireless device, measurement data comprising measurements of qualities of beams observed by said wireless device, wherein said beams include at least one beam that originates from a first AN in the wireless network and include at least one beam that originates from a second AN in said wireless network;
   a controller configured to retrieve in a historical database, at least one measurement data from a particular wireless device similar to the received measurement data, wherein the historical database comprises historical measurement data comprising measurements of qualities of beams observed by wireless devices in said wireless network over time, and to select a set of beams to be monitored by said wireless device based on said retrieved at least one measurement data and based on subsequent measurement data of said particular wireless device over time in said historical database; and
   a transmitter configured to transmit an indication of said selected set of beams to be monitored to said wireless device.

12. The network node of claim 11, wherein said received measurement data comprising measurements of qualities of beams observed by said wireless device comprises at least one of any of:
   a signal-to-noise ratio for each of said beams;
   a Received Signal Strength Indicator (RSSI) for each of said beams;
   a Reference Signal Received Power (RSRP) for each of said beams; and
   a Reference Signal Received Quality (RSRQ) for each of said beams.

13. The network node of claim 11, wherein the controller is further configured to:
   determine, based on said retrieved at least one measurement data from said particular wireless device and based on subsequent measurement data of said particular wireless device over time in said historical database, that said wireless device is to be handed over to a different AN in said wireless network; and
   perform a handover of said wireless device to said determined different AN in said wireless network.

14. The network node of claim 11, wherein said transmitter is further configured to:
   transmit a frequency parameter indicating to said wireless device how many measurements for said selected set of beams are to be performed by said wireless device.

15. A wireless device arranged for monitoring a set of beams in a telecommunication network, said wireless device comprising:
   a receiver configured to receive an indication of a set of beams to be monitored;
   a controller configured to measure qualities of the set of beams and to select a subset of said set of beams based on said measured qualities of said received set of beams, and
   a transmitter configured to transmit measurement data comprising measurements of qualities of only said subset of beams to said AN.

16. The wireless device of claim 15, wherein said measurements of qualities comprise at least one of any of:
   a signal-to-noise ratio for each of said beams;
   a Received Signal Strength Indicator (RSSI) for each of said beams;
   a Reference Signal Received Power (RSRP) for each of said beams; and
   a Reference Signal Received Quality (RSRQ) for each of said beams.

17. The wireless device of claim 15, wherein said subset of said beams consists of a fixed quantity of beams.

18. The wireless device of claim 15, wherein said receiver is configured to receive said set of beams from a plurality of ANs.

19. The wireless device of claim 15, wherein the receiver is further configured to receive, based on transmission of said measurement data to said AN, an indication of another set of beams to be monitored.

* * * * *

UNITED STATES PATENT AND TRADEMARK OFFICE
CERTIFICATE OF CORRECTION

PATENT NO. : 10,966,134 B2
APPLICATION NO. : 16/434690
DATED : March 30, 2021
INVENTOR(S) : Guerreiro et al.

Page 1 of 3

It is certified that error appears in the above-identified patent and that said Letters Patent is hereby corrected as shown below:

On the Title Page

Item (56), under "OTHER PUBLICATIONS", in Column 2, Line 1, delete "3GPP ," and insert -- 3GPP, --, therefor.

Item (57), under "ABSTRACT", in Column 2, Line 11, delete "UE's" and insert -- UEs --, therefor.

In the Drawings

In Fig. 2, Sheet 2 of 8, for Tag "303", in Line 1, delete "RETREIV" and insert -- RETRIEVE --, therefor.

In Fig. 5, Sheet 5 of 8, for Step "303", in Line 1, delete "Retrieiving" and insert -- Retrieving --, therefor.

In the Specification

In Column 1, Line 47, delete "addresses" and insert -- addressed --, therefor.

In Column 1, Line 48, delete "AN's," and insert -- ANs, --, therefor.

In Column 1, Line 54, delete "AN's" and insert -- ANs --, therefor.

In Column 2, Line 15, delete "UE" and insert -- UE. --, therefor.

In Column 2, Line 25, delete "UE's" and insert -- UEs --, therefor.

In Column 2, Line 38, delete "UE's" and insert -- UEs --, therefor.

In Column 2, Line 41, delete "UE's" and insert -- UEs --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

U.S. Pat. No. 10,966,134 B2

In Column 2, Line 43, delete "advantageous" and insert -- advantage --, therefor.

In Column 2, Line 60, delete "AN's," and insert -- ANs, --, therefor.

In Column 2, Line 64, delete "UE's" and insert -- UEs, --, therefor.

In Column 3, Line 13, delete "AN's" and insert -- ANs --, therefor.

In Column 3, Line 52, delete "sub frame" and insert -- subframe --, therefor.

In Column 4, Line 17, delete "RSRP" and insert -- RSRP, --, therefor.

In Column 4, Line 62, delete "beams, and" and insert -- beams; and --, therefor.

In Column 5, Line 27, delete "UE's" and insert -- UEs --, therefor.

In Column 5, Line 28, delete "over time," and insert -- over time; --, therefor.

In Column 5, Line 42, delete "RSRP" and insert -- RSRP, --, therefor.

In Column 6, Line 7, delete "beams, and" and insert -- beams; and --, therefor.

In Column 6, Line 27, delete "UE's" and insert -- UEs --, therefor.

In Column 6, Line 28, delete "over time," and insert -- over time; --, therefor.

In Column 6, Line 47, delete "beams, and" and insert -- beams; and --, therefor.

In Column 7, Lines 18-19, delete "example is 1 is" and insert -- example 1 is --, therefor.

In Column 7, Line 49, delete "AN2*a*, AN 2*b* and AN1*b*." and insert -- AN 2*a*, AN 2*b* and AN 1*b*. --, therefor.

In Column 8, Line 15, delete "illustration 52" and insert -- illustration 51 --, therefor.

In Column 8, Lines 27-28, delete "base station function 112" and insert -- base station function 102 --, therefor.

In Column 8, Line 49, delete "AN's," and insert -- ANs, --, therefor.

In Column 8, Line 50, delete "AN's" and insert -- ANs --, therefor.

In Column 9, Line 6, delete "performed" and insert -- perform --, therefor.

In Column 9, Line 31, delete "UE's" and insert -- UEs --, therefor.

CERTIFICATE OF CORRECTION (continued)
U.S. Pat. No. 10,966,134 B2

In Column 9, Line 36, delete "time stamp, or any other meta data" and insert -- timestamp, or any other metadata --, therefor.

In Column 9, Line 40, delete "time stamps" and insert -- timestamps --, therefor.

In Column 9, Line 53, delete "a intra" and insert -- an intra --, therefor.

In Column 10, Line 40, delete "UE's" and insert -- UEs --, therefor.

In Column 11, Line 3, delete "beams, and" and insert -- beams; and --, therefor.

In Column 11, Line 29, delete "UE's" and insert -- UEs --, therefor.

In Column 11, Line 60, delete "beams, and" and insert -- beams; and --, therefor.

In Column 12, Line 7, delete "van be" and insert -- can be --, therefor.

In the Claims

In Column 12, Line 31, in Claim 1, delete "over time," and insert -- over time; --, therefor.

In Column 14, Line 35, in Claim 15, delete "beams, and" and insert -- beams; and --, therefor.